Aug. 8, 1933.     J. P. WALKER     1,921,247
MILK CAN AND METHOD OF MAKING SAME
Filed May 11, 1932
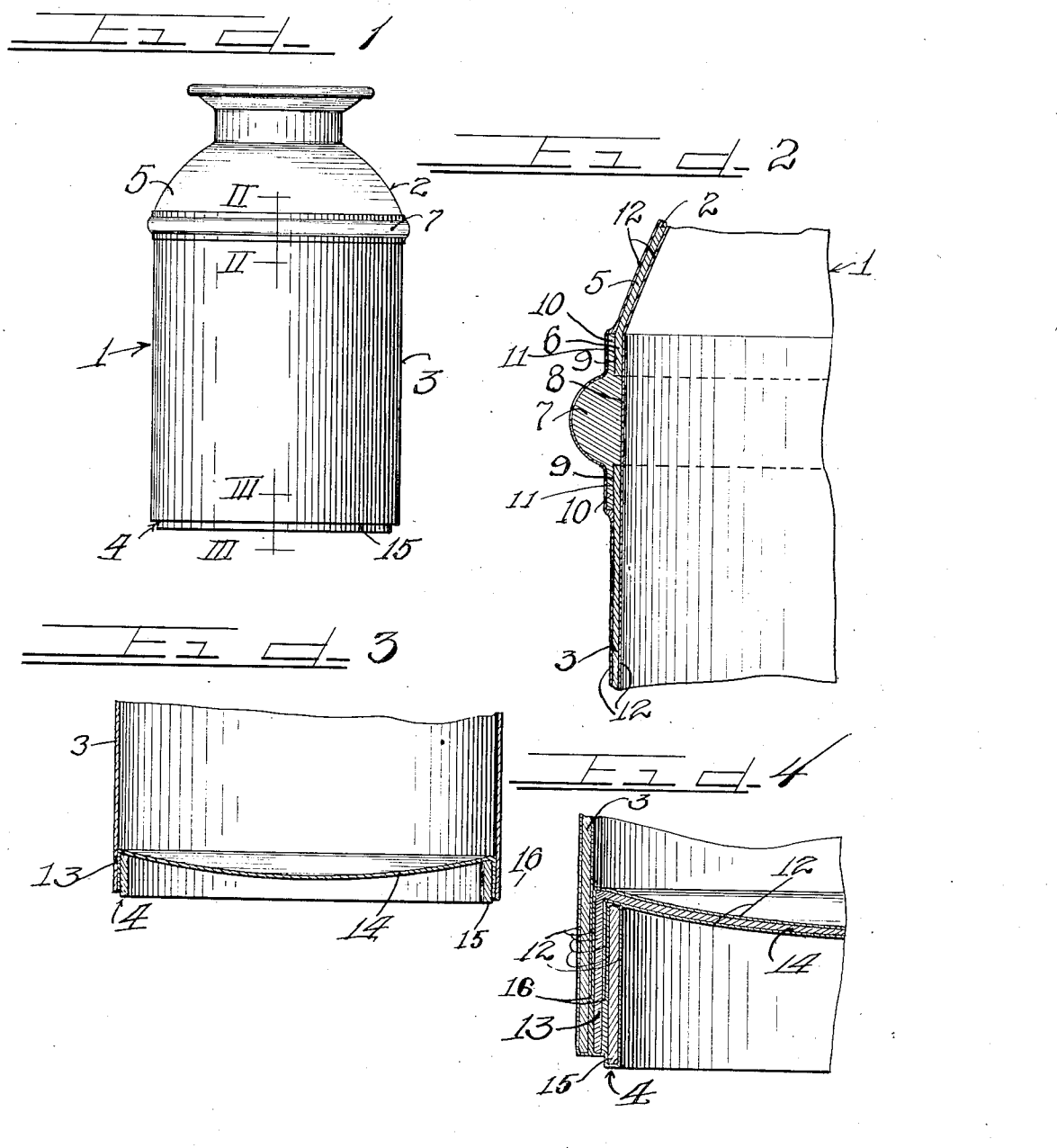

Patented Aug. 8, 1933

1,921,247

UNITED STATES PATENT OFFICE 1,921,247

MILK CAN AND METHOD OF MAKING SAME

James P. Walker, Maywood, Ill., assignor to Solar-Sturges Mfg. Co., Melrose Park, Ill., a Corporation of Illinois Application May 11, 1932. Serial No. 610,550

6 Claims. (Cl. 113—120)

REISSUED

This invention has to do with milk cans and has for its object to provide a milk can of improved construction.

In the past, it has been the custom in the manufacture of milk cans to provide a breast and body which overlapped, the overlapping portions being riveted together and the inner and outer surfaces of the cans tinned. This construction has been found unsatisfactory for the reason that the edges of the overlapping portions constitute obstructions marring the otherwise smooth surfaces of the breast and body and in addition providing seats for the reception of foreign matter of a character having a corroding influence so that in a short time leaks arise and repairing and retinning are found necessary to render the same fit for use.

It is accordingly an object of the present invention to construct a milk can of such character that the above mentioned disadvantages will be obviated at a low manufacturing cost.

Constructions of this character in the past have had the further disadvantage that they have been seriously affected by the ordinary everyday abuse to which the cans are subjected in handling, and it is accordingly an object of the present invention to provide means forming a protective ring about the body of the can to resist deformation of the can by impacts against the can during handling of the same.

The base of the type of can heretofore manufactured has been especially vulnerable to the rough handling to which milk cans are ordinarily subjected, so that replacement of the same has been necessarily frequent. The base has been riveted to the bottom of the body of the can, and in separating the two, it has been necessary to remove the rivets or the like, thereby mutilating both the lower end of the body and the base, the repair of which has often required the cutting off of the lower end so mutilated. It is accordingly a still further object of the invention to provide a base construction for a can of the character referred to, whereby the lower end of the can body is less subject to abuse in handling and further whereby removal and replacement of the base may be accomplished without mutilating any of the parts involved.

In accordance with the general features of the invention, the breast and body are not overlapped, but on the contrary are positioned somewhat spaced apart, and a connecting ring placed therebetween and secured to the respective adjacent parts of the breast and body by welding or the like, thereby presenting a continuous interior surface, the inner and outer surfaces being subsequently tinned. The lower end of the body has secured interiorly thereto a base in the form of a short cylinder provided with a dished upper end, an open ended cylinder being positioned within the cylindrical base member referred to and projecting somewhat downwardly beyond the lower end of the can body and the base member, so that the entire can rests on the projecting portion. All of these parts are initially tinned and positioned in the relation mentioned, whereupon they are subjected to a temperature sufficient to melt the tin, and the parts thus sweated together and allowed to cool.

Other and further important objects of this invention will be apparent from the disclosures in the specification and the accompanying drawing.

This invention (in a preferred form) is illustrated in the drawing and hereinafter more fully described.

On the drawing:

Figure 1 is an elevational view of a milk can or the like constructed in accordance with the principles of the present invention.

Figure 2 is an enlarged fragmentary half sectional view taken approximately in the plane indicated by the line II—II in Figure 1.

Figure 3 is an enlarged fragmentary sectional view taken approximately in the plane indicated by the line III—III in Figure 1.

Figure 4 is an enlarged fragmentary sectional view of certain details of Figure 3.

Referring now more particularly to the drawing, wherein the same parts are designated throughout by the same reference characters, the can 1 is preferably made mainly of sheet metal and includes among other things a breast 2, a body 3 and a base construction indicated generally at 4. The breast 2 has a substantially conical portion 5 and a cylindrical skirt 6, the latter having the same diameter as the body 3, but being spaced therefrom as shown in Figure 2. For the purpose of uniting the skirt 6 with the body 3, there is provided a ring 7 having an internal cylindrical surface 8 which is flush with the interior surfaces of the skirt 6 and body 3, the ring 7 being counterbored on opposite ends of the surface 8 as shown at 9. This counterbore is such that the surface thereof is snugly engaged with the outer cylindrical surfaces of the skirt 6 and body 3, respectively, when the surface 8 of the ring 7 is positioned flush with the inner surfaces of the skirt 6 and the body 3 as shown in Figure 2.

With the parts assembled as just mentioned, the end portions 10 of the ring 7 are welded at 11 to the skirt 6 and body 3, respectively, throughout their circumference, thereby providing a water and moisture proof joint between the breast 2 and body 3. The ring 7 may have any desired cross-sectional shape, but is preferably substantially semi-circular in cross-section as shown, thereby providing a protective portion for preventing marring and mutilation of the adjacent breast and body portions of the can from abuse.

With the parts connected as just described, the can is tinned inside and out as shown at 12 in the enlarged showing of Figure 2. It will be observed that the inner surface of the can as thus constructed is entirely uninterrupted, thereby obviating any tendency for moisture to collect at any spot so that no corrosion and reduction in the life of the can can ensue.

In accordance with this invention, the base construction of the can indicated generally at 4 is of the built-up type, embodying a short cylindrical member 13 closed at its upper end by a downwardly dished head 14 for the purpose of lending strength to the can, and a second short cylindrical open-ended member 15. The cylindrical member 13 is so formed that its outer periphery is of slightly less diameter than the interior surface of the body 3, and so that its interior periphery is slightly greater than the outer periphery of the second cylindrical member 15. After the parts 13 and 15 are formed, their entire exposed surfaces are individually tinned and cooled, and after this operation the parts are assembled as shown in Figure 3, with a tight fit. The parts thus arranged are subjected to a temperature of about 450° F., whereby the tinning on the engaged surfaces of the body 3 and the members 13 and 15 is caused to melt and to flow, thereby causing the parts to be sweated together as shown in Figure 4. The heat is applied to a zone whose upper limit 16 is below the head 14, so that the tin lining on the head and on the inner surface of the body 3 above the head will not flow and be thus weakened. When the parts are cooled, they are thereby firmly secured together.

It will be noted that the parts are so arranged that the member 15 projects somewhat below the lower ends of the body 3 and member 13, and is moreover made somewhat thicker than the body 3 and member 13 for the reason that it constitutes the foot upon which the can rests and is thus subjected to greater wear and stress. The body 3 is thereby protected from mutilation which would otherwise occur if it were allowed to rest directly upon the ground or platform.

The base construction of the present invention is of sufficient rigidity to perform the intended function. The advantages of the base construction of the present invention are further realized when it is necessary to repair the same. In the past, due to the riveted or like construction, it has been necessary in the separation of the parts to mutilate the same, so that it has been necessary oftentimes to cut off the mutilated lower end of the can and either apply a new piece or secure the base portion to the body thus reduced, thereby reducing the size of the can. In accordance with the present invention, however, it is necessary merely to subject the lower end of the can, up to the line 16, to a temperature sufficient to melt the tinning 12, whereupon the parts 3, 13 and 15 may be readily separated, the member 15 replaced by a new one, and the parts then sweated together as above described. These operations consume a much shorter time than the disassembling and assembling operations required in the case of previous constructions, and are moreover relatively inexpensive.

The can may be made in any shape other than round without departing from the principles of the invention.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. The method of constructing a can, comprising the steps of forming a can body with an open end, tinning the interior surface of said end, forming an inverted cup-like closure for said end, tinning the inner and outer surfaces of said closure so that the closure fits within said end with a tight fit, forming a foot for the can, tinning the outer surface of said foot and fitting the foot in the closure with a tight fit, subjecting only the lower portions of all of the interfitting parts to a temperature which melts the tin and causes the same to flow, thereby sweating the parts firmly together, and allowing the same to cool.

2. In a can construction for the commercial transportation of milk, ice cream and the like, a body having a coating of solder, an inverted cup-like bottom for and located in the body and coated with solder, said bottom and body being connected to each other by a tight fit only between the upper soldered surface of the bottom and the adjacent soldered surface of the body, the lower soldered surface of the bottom and adjacent solder on the body being integrally soldered together, whereby a sealed joint is afforded between the body and the bottom and whereby application of heat to effect a separation of the bottom from the body may be localized to thereby avoid disturbing the remaining solder surfaces.

3. In a can construction for the commercial transportation of milk, ice cream and the like, a body and a closure therefor, the inner surfaces of said body and closure having a smooth coating of tin to afford a sanitary interior and prevent corrosion of the body and closure, said closure including an inverted cup-like member whose side wall is soldered to the body only along an area remote from the top of the member, whereby the application of heat to effect a connection or separation of said body and closure may be localized to avoid disturbance of said coating.

4. The method of constructing a heavy duty can, comprising the steps of forming a can body with an open end, tinning the interior surface of said end, forming a cup-shaped closure for said end, tinning the inner and outer surfaces of said closure and fitting said closure, inverted, within said end with a tight fit, forming a foot for the can, tinning the outer surface of said foot and fitting the foot in the closure with a tight fit, subjecting all of the interfitting parts only along an area remote from the top of the closure to a temperature which melts the tin and causes the same to flow, thereby sweating the parts firmly together only at said area, and allowing the tin to cool and solidify.

5. The method of securing a protective foot to the flange of a surface-tinned heavy duty can, comprising the steps of tinning the inner surface of said flange and the outer surface of said foot, fitting said foot with a tight fit in said flange, and sweating only an area of the foot to said flange remote from the interior of the can, whereby the tinned surface of the interior of the can is not disturbed by the sweating operation.

6. In a can construction, a body having a coating of solder, an inverted cup-like bottom for and located in the body and coated with solder, said bottom and said body being connected to each other by a tight fit only between the upper soldered surface of the bottom and the adjacent soldered surface of the body, a cylindrical foot member having a coating of solder, said foot member tightly fitting within the depending wall portion of said cup-like bottom and arranged extending therebeyond to protect said body and said bottom against mutilation in handling, the lower portions of said body and said bottom and said foot member being integrally soldered together whereby a sealed joint is afforded between said integrally soldered members and whereby said foot may be removed upon application of heat to the lower portion thereof.

JAMES P. WALKER.